INVENTORS.
H.M. FLEMING, JR.
I. GARDOFF
R. LAMANNA
M. WEINBERG
BY E. Jerry Light
ATTORNEY June 19, 1962 H. M. FLEMING, JR., ETAL 3,039,691

BINARY INTEGER DIVIDER

Filed Jan. 7, 1957 2 Sheets-Sheet 2

*INVENTORS.*
H. M. FLEMING, JR.
I. GARDOFF
R. LA MANNA
M. WEINBERG

BY *[signature]*
ATTORNEY

3,039,691
BINARY INTEGER DIVIDER

Howard M. Fleming, Jr., Basking Ridge, N.J., Irving Gardoff, Schenectady, N.Y., and Richard La Manna, Whippany, and Murray Weinberg, Elizabeth, N.J., assignors to Monroe Calculating Machine Company, Orange, N.J., a corporation of Delaware Filed Jan. 7, 1957, Ser. No. 632,737
19 Claims. (Cl. 235—165)

This invention relates to circuit arrangements for performing the mathematical operation of division. More particularly, though not exclusively, this invention relates to apparatus for determining in binary form the largest integral number of times which divisor numbers, fundamental to numbers systems other than the binary system, are contained in a dividend number.

In apparatus for handling numbers expressed in the binary notation in serial form, division by powers of two is easily accomplished by shifting the pulse train representing a quantity in the direction of less significance. The result of such shifting is a pulse train representing a quantity which is equal to division by two to the power of the number of bit or pulse times shifted. However, division by powers of two does not fit itself completely with decimal operation. A readily obtainable division by ten is of extreme value in handling decimal operations. Division by ten can be achieved by a division by five coupled with a division by two. Of course, division by two is easily obtained by a shift of one bit or pulse time in the direction of less significance. The part sought then is one fifth of the original quantity.

When operations pertaining to the duo-decimal system are involved, it would be convenient to obtain one twelfth of a quantity. This can be broken down into a division by four, which is accomplished in the binary system merely by a shift of two bits or pulse times in the direction of less significance, and a division by three. The part sought here is one third of the original quantity.

Objects of the invention are:

(1) To obtain the integral portion of the number of times an integer value is contained in a quantity expressed in binary notation.

(2) To obtain the integral portion of the number of times the value three is contained in a quantity expressed in binary notation.

(3) To obtain the integral portion of the number of times the value five is contained in a quantity expressed in binary notation.

Viewed in a broader aspect, it is an object of the invention to obtain the integral portion of the number of times any odd number is contained in a quantity expressed in binary notation. Recognizing the specific nature of acknowledged number systems, the aforementioned numbers three and five assume overwhelming importance among the odd number divisors for which the integral portion of a quotient is sought.

This follows immediately from the above noted facts that, the number three is integral factor of the duo-decimal system base number 12, the factors associated with three to achieve this base number are two and two. Hence, it is clear that duo-decimal operation may be accomplished in binary notation merely by shifting binary digits to account for this latter pair of "two's" and applying the number three in appropriate fashion to the shifted binary number.

Similarly, for the decimal system, a single binary shift accomplished by a corresponding binary five operation leads to a simple decimal representation of the resultant expression.

Other objects and a fuller understanding of the invention may be had by referring to the following description and claims, taken in conjunction with the accompanying drawings in which:

Figures 2, 3, 4:
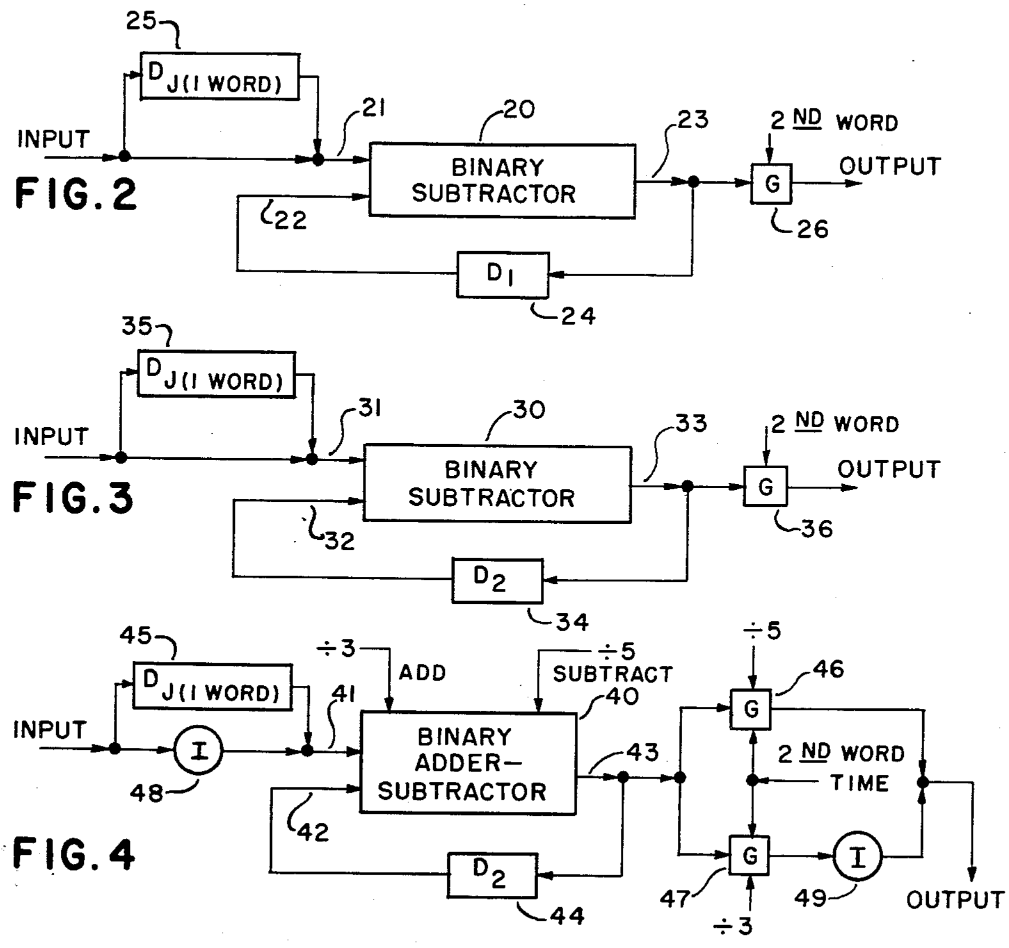
FIG. 2 shows a specific adaptation of the invention to divide by three.
Figures 2A, 3A, 4A, 4B:
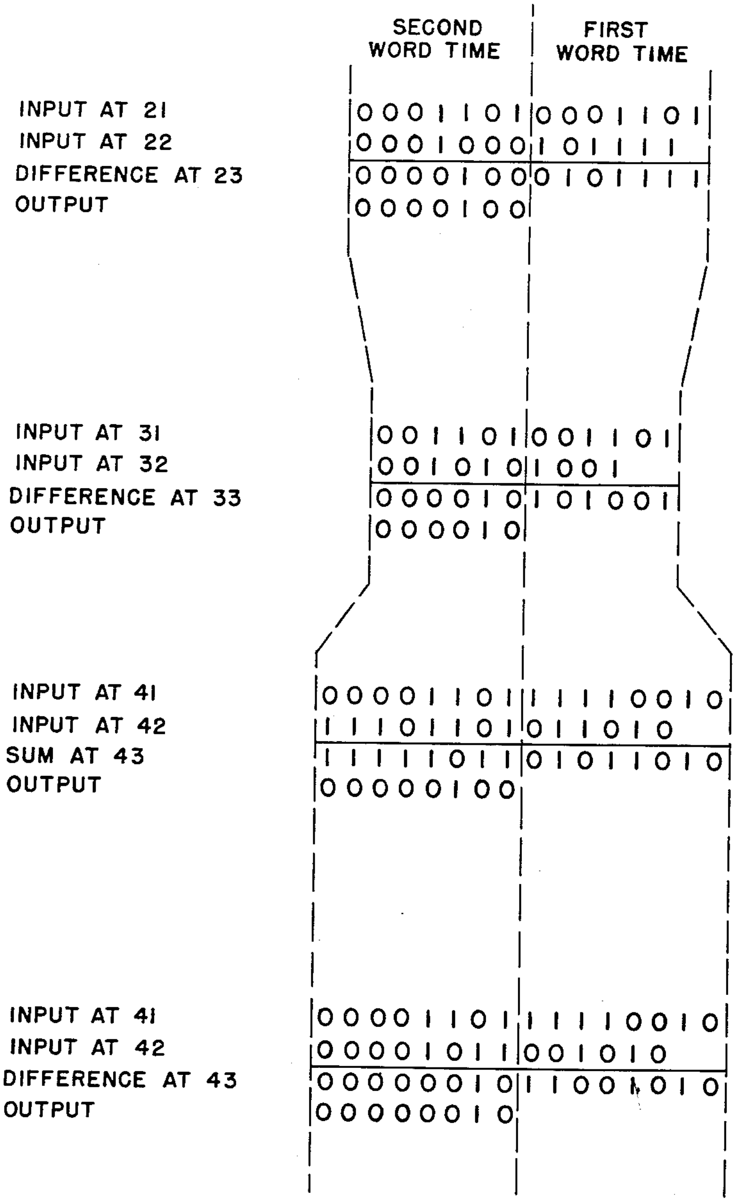

FIG. 2*a* shows diagrammatically an example of the operation of the circuit of FIG. 2;

FIG. 3 shows a specific adaptation of the invention to divide by five;

FIG. 3*a* shows diagrammatically an example of the operation of the circuit of FIG. 3;

FIG. 4 shows a specific adaptation of the invention to obtain either a division by three or by five;

FIG. 4*a* shows diagrammatically one example of the operation of the circuit of FIG. 4; and FIG. 4*b* shows diagrammatically a second example of the operation of the circuit of FIG. 4.

Figure 1:
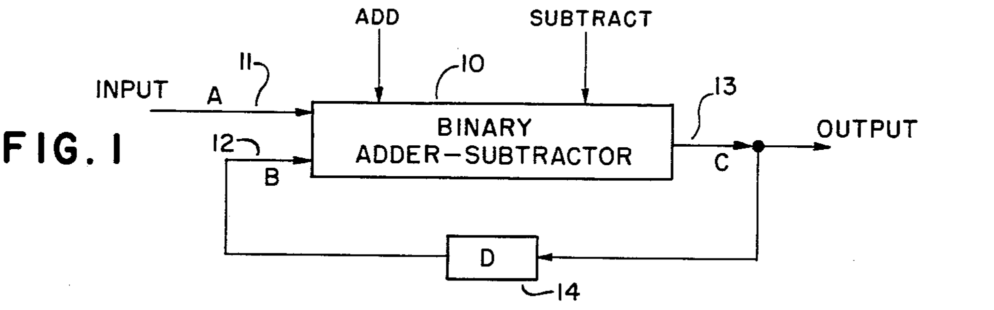
FIG. 1 shows the general circuit of the invention.

Referring to the drawings, there is shown, in FIG. 1, a binary adder-subtractor circuit 10 having augend-minuend input 11, addend-subtrahend input 12 and sum-difference output 13. Circuit 10 performs either addition or subtraction i.e., this circuit algebraically adds quantities of either like or opposite signs, in accordance with control signals applied and may be of the type described on pages 283–285 of High Speed Computing Devices by the staff of Engineering Research Associates, published by McGraw Hill Book Co., 1950. Connected between output 13 and the input 12 is a delay device 14 for delaying transmission of pulses supplied to its input for an integral number of pulse times. Delay device 14 may be of the well known lumped parameter, artificial transmission line type.

Identifying the input at 11 as A, the input at 12 as B, the output at 13 as C and the number of pulse times for which delay device 14 delays transmission as D, in the situation where adder-subtractor circuit 10 is operating as a subtractor:

$$C=A-B \text{ and}$$

$$B=2^{D}C$$

Substituting and collecting terms:

$$C=A-2^{D}C \text{ and}$$

$$C=\frac{1}{2^{D}+1}A \qquad (1)$$

In the situation where circuit 10 is operating as an adder:

$$C=A+B \text{ and}$$

$$B=2^{D}C$$

Substituting and collecting terms:

$$C=A+2^{D}C \text{ and}$$

$$C=\frac{1}{1-2^{D}}A \qquad (2)$$

It is seen from Equations 1 and 2 that if D equals one pulse or bit time and circuit 10 is operating as a subtractor we obtain $$\frac{A}{3}$$

If D equals two pulse or bit times and circuit 10 is operating as a substractor we obtain $$\frac{A}{5}$$

while if circuit 10 is operating as an adder, we obtain $$-\frac{A}{3}$$

respectively. Of course, it is possible to convert from $$-\frac{A}{3} \text{ to} +\frac{A}{3}$$

by taking the complement of $$-\frac{A}{3}$$

(by complementing the output of the adder).

The above holds true for binary quantities equal in value to an integral multiple of the divisor. However, if the value of the binary quantity is not an integral multiple of the divisor the above does not give the desired result. It is seen that if the quantity to be divided, having a value K represented in a word time of J pulse times, is applied to the input 11 for two successive word times, there is applied to the input 11 a value N where $$N=K+2^{J}K \text{ or}$$
$$N=(1+2^{J})K \quad (3)$$

However, if the quantity K is applied in its complement form during the first word time, the value N applied to input 21 is $$N=-K+2^{J}K \text{ or}$$
$$N=(2^{J}-1)K \quad (4)$$

By applying the pulse train representing the quantity to be divided for two successive word times or by applying the complement of the pulse train representing the quantity to be divided followed by the pulse train of the quantity itself, we obtain a variable $(2^{J}\pm1)$ which can be made an integral multiple of the divisor by the proper choice of J. Accordingly, the number of bits J making up the input word pulse train depends on the integral portion thereof which it is desired to determine.

It has been found, when an input to the circuit of this invention appears for two word times in accordance with either Equations 3 or 4, that the pulse train appearing at the output of the adder-subtractor during the second word time is related to the integral portion of the number of times an integer value is contained in a quantity. The relation that the mentioned pulse train bears to the desired result is either direct (the desired result) or inverse (the complement of the desired result). When an adder is used and the number of pulse times for which the delay device 14 delays transmission (D) is 2 or greater, a minus sign results for the right hand portion of Equation 2 and the inverse of the desired result is produced which must be complemented. Referring to Equation 3, if it is desired to obtain the integral portion of the number of times the value three is contained in a quantity, the number of bits J for representing the quantity must be an odd number. If the presentation represented by Equation 4 is used for the division by three, the quantity must be represented in a word consisting of an even number of bits J. For obtaining the integral portion of the number of times the value five is contained in a quantity, using the presentation represented by Equation 3, a word having an odd-multiple-of-two bits is required for representing the quantity; using the presentation represented by Equation 4, a word having an even-multiple-of-two bits is required.

FIGURE 2 shows the invention applied for obtaining a division by three in accordance with Equations 1 and 3. Accordingly, a delay D of one pulse time is necessary and the binary quantity representation must contain an odd number of bits J. Referring to FIG. 2 there is a binary subtractor circuit 20 having minuend input 21, subtrahend input 22 and difference output 23. Binary subtractor may take the form described on pages 281–283 of High Speed Computing Devices, supra. Connected between difference output 23 and subtrahend input 22 is a delay device 24 for delaying transmission for one pulse time which may be an artificial transmission line, the same as element 14 of FIG. 1. Connected in parallel to input line 21 is a delay device 25 for delaying transmission for the number of pulse times or bits making up a complete word, J. Delay device 25 may be of the artificial transmission line type, or more conveniently may be a shifting register as disclosed in Patent No. 2,638,542 to Fleming, Jr. or may be a mercury delay line as described on pages 341–348 of the book High Speed Computing Devices, supra. Connected to the difference output line 23 is a permissive gate 26 which is controlled by a timing signal to pass signals or pulses only during the second word time of operation of the circuit. Gate 26 may be any one of the known permissive gate circuits such as a multi-grid vacuum tube or diode circuit.

The quantity to be divided is applied to minuend input line 21 in sequential pulse fashion. The quantity thus enters the subtractor circuit 20 and the delay circuit 25. All pulses appearing on line 23 are applied to the subtrahend input 22 after a delay of one pulse time in delay device 24, and are combined subtractively with the pulses applied at minuend input 21. During the time for the entire word to be applied, that is, during the first word time, gate 26 is closed and no pulses appear at the output. At the beginning of the second word time the input word or quantity is just emerging from delay device 25 from whch it is reapplied on the minuend input 21. Of course, if the input quantity is available from the input for two successive word times, delay device 25 is not necessary and the input number is reapplied from the input. At the beginning of the second word time gate 26 is opened by a timing signal and is maintained open during the entire second word time to pass the pulse train at 23 to the output.

As an example, the number 13 expressed in binary notation in a word time of seven pulse times, applied to the circuit of FIG. 2 and the results thereof are shown in FIG. 2*a* with a time scale reading from right to left.

Referring now to FIG. 3, there is shown a circuit for obtaining the integral portion of the number of times the value five is contained in a quantity in accordance with Equations 1 and 3. Accordingly, a delay D of two pulse times is necessary and the binary words handled must contain an even number of bits which number is not an integral multiple of 4 or, expressed in another fashion, the number of bits must be an odd-multiple-of-two. The showing in FIG. 3 is identical to the showing in FIG. 2 except that the delay device 34 between the difference output and the subtrahend input of the subtractor circuit delays transmission for two pulse times whereas the corresponding delay device 24 in FIG. 2 delays transmission for one pulse time.

FIG. 3*a* illustrates the operation of the circuit of FIG. 3 with the number 13 expressed in binary notation in a word time of six pulse times applied at the input 31.

FIG. 4 shows a circuit in accordance with the invention whereby the integral portion of the number of times either the value three or five is contained in a quantity is obtainable in accordance with Equations 1, 2, and 4. A delay device D of two pulse times is utilized with an application of Equation 1 to divide by five and of Equation 2 to divide by three. Binary words handled by this circuit must contain an even number of bits which number is a multiple of 4, or an even-multiple-of-two bits, per Equation 4. Thus, an adder-subtractor circuit 40, like the adder-subtractor circuit 10 of FIG. 1, is utilized with the circuit 40 operated as an adder circuit for division by three and operated as a subtractor circuit for division by five. The sum-difference output 43 of circuit 40 is fed to the addend-subtrahend input 42 via two-pulse-delay device 44.

The input word or quantity is complemented before being applied to augend-minuend input 41 for its first application or during the first word time. This is done by applying the input number via inverter 48 which may be an amplifier the anode of which represents the inverse of signals applied to its grid. During the second word time, the input word or quantity is applied directly to line 41 either by being applied from delay device 45, to which it is applied during the first word time, as shown, or by being available from the input during the second word time. Sum-difference line 43 is also connected to permissive gates 46 and 47, in parallel. Gates 46 and 47 are three-input-gates both of which are enabled only during the second word time by a timing signal. In addition, gate 46 operates only for division by five, and gate 47 operates only for division by three, as shown. The output of gate 46 is connected directly to the output line, while the output of gate 47 is connected to the output line through the complementing inverter 49.

At the end of the second word time adder-substractor circuit 40 may be made inactive to clear out any circulation of pulses therethrough to the sum-difference output 43, delay device 44 and back to addend-subtrahend input 42.

Referring to FIGURES 4*a* and 4*b*, there are shown illustrations of the operation of the circuit of FIG. 4 with the number 13 expressed in binary notation in a word of eight pulse times applied at the input; in FIG. 4*a* the circuit is operating for dividing by three and in FIG. 4*b* the circuit is operating for dividing by five.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A circuit arrangement for obtaining an integral portion of the number of times an integer value is contained in a quantity represented by a serial train of pulses in the binary notation, comprising an adding-subtracting means having an augend-minuend input, an addend-subtrahend input and a sum-difference output, a delay means for delaying transmission for an integral number of pulse times different from the number of pulse times assigned to said serial train connected between said sum-difference output and said addend-subtrahend input, means for controlling said adding-subtracting means to add or to subtract, means for applying the pulse train representing the quantity to be divided to said augend-minuend input for two successive pulse train times and means for obtaining a pulse train related to the result pulse train from said sum-difference output during said second pulse train time.

2. A circuit arrangement for obtaining an integral portion of the number of times an integer value is contained in a quantity represented by a serial train of pulses in the binary notation, comprising a subtracting means having a minuend input, a subtrahend input, and a difference output, a delay means for delaying transmission for an integral number of pulse times different from the number of pulse times assigned to said serial train connected between said difference output and said subtrahend input, means for applying the pulse train representing the quantity to be divided to said minuend input for two successive pulse train times and means for obtaining the result pulse train from said difference output during said second pulse train time.

3. A circuit arrangement for obtaining an integral portion of the number of times an integer value is contained in a quantity represented by a serial train of pulses in the binary notation, comprising an adding means having an augend input, an addend input and a sum output, a delay means for delaying transmission for an integral number of pulse times different from the number of pulse times assigned to said serial train connected between said sum output and said addend input, means for applying the pulse train representing the quantity to be divided to said augend input for two successive pulse train times and means for obtaining the complement of the result pulse train from said sum output during said second pulse train time.

4. A circuit arrangement for obtaining an integral portion of the number of times an integer value is contained in a quantity represented by a serial train of pulses in the binary notation, comprising an adding-subtracting means having an augend-minuend input, an addend-subtrahend input and a sum-difference output, a delay means for delaying transmission for an integral number of pulse times different from the number of pulse times assigned to said serial train connected between said sum-difference output and said addend-subtrahend input, means for controlling said adding-subtracting means to add or to subtract, means for applying the complement of the pulse train representing the quantity to be divided to said augend-minuend input during a first pulse train time and for applying the pulse train representing the quantity to be divided to said augend-minuend input during a second pulse train time and means for obtaining a pulse train related to the result pulse train from said sum-difference output during said second pulse train time.

5. A circuit arrangement for obtaining an integral portion of the number of times an integer value is contained in a quantity represented by a serial train of pulses in the binary notation, comprising a subtracting means having a minuend input, a subtrahend input, and a difference output, a delay means for delaying transmission for an integral number of pulse times different from the number of pulse times assigned to said serial train connected between said difference output and said subtrahend input, means for applying the complement of the pulse train representing the quantity to be divided to said minuend input during a first pulse train time and for applying the pulse train representing the quantity to be divided to said minuend input during a second pulse train time and means for obtaining the result pulse train from said difference output during said second pulse train time.

6. A circuit arrangement for obtaining an integral portion of the number of times an integer value is contained in a quantity represented by a serial train of pulses in the binary notation, comprising an adding means having an augend input, an addend input and a sum output, a delay means for delaying transmission for an integral number of pulse times different from the number of pulse times assigned to said serial train connected between said sum output and said addend input, means for applying the complement of the pulse train representing the quantity to be divided to said augend input during a first pulse train time and for applying the pulse train representing the quantity to be divided to said augend input during a second pulse train time and means for obtaining the complement of the result pulse train from said sum output during said second pulse train time.

7. A circuit arrangement for obtaining an integral portion of the number of times an integer value is contained in a quantity represented by a serial train of pulses in the binary notation, comprising an adding-subtracting means having an augend-minuend input, an addend-subtrahend input and a sum-difference output, a delay means for delaying transmission for an integral number of pulse times different from the number of pulse times assigned to said serial train connected between said sum-difference output and said addend-subtrahend input, means for applying the complement of the pulse train representing the quantity to be divided to said augend-minuend input during a first pulse train time and for applying the pulse train representing the quantity to be divided to said augend-minuend input during a second pulse train time, means for controlling said adding-subtracting means to add or to subtract, means for obtaining a result pulse train from said sum-difference output during said second pulse train time and selectively effectuated means for complementing said result pulse train.

8. A circuit arrangement for obtaining an integral portion of the number of times an integer value is contained in a quantity represented by a serial train of pulses in the binary notation, comprising an adding means having an augend input, an addend input and a sum output, a delay means for delaying transmission for an integral number of pulse times different from the number of pulse times assigned to said serial train connected between said sum output and said addend input, means for applying the complement of the pulse train representing the quantity to be divided to said augend input during a first pulse train time and for applying the pulse train representing the quantity to be divided to said augend input during a second pulse train time, means for obtaining a result pulse train from said sum output during said second pulse train time and means for complementing said result pulse train.

9. A circuit arrangement for obtaining the integral portion of the number of times the value three is contained in a quantity represented by a serial train of pulses in the binary notation, comprising a subtracting means having a minuend input, a subtrahend input and a difference output, a delay means for delaying transmission for one pulse time connected between said difference output and said subtrahend input, means for applying the pulse train representing the quantity to be divided to said minuend input for two successive pulse train times and means for obtaining the result pulse train from said difference output during said second pulse train time.

10. A circuit arrangement for obtaining the integral portion of the number of times the value three is contained in a quantity represented by a serial train of pulses in the binary notation, comprising an adding means having an augend input, an addend input and a sum output, a delay means for delaying transmission for two pulse times connected between said sum output and said addend input, means for applying the complement of the pulse train representing the quantity to be divided to said augend input during a first pulse train time and for applying the pulse train representing the quantity to be divided to said augend input during a second pulse train time, means for obtaining a result pulse train from said sum output during said second pulse train time and means for complementing said result pulse train.

11. A circuit arrangement for obtaining the integral portion of the number of times the value five is contained in a quantity represented by a serial train of pulses in the binary notation, comprising a subtracting means having a minuend input, a subtrahend input and a difference output, a delay means for delaying transmission for two pulse times connected between said difference output and said subtrahend input, means for applying the pulse train representing the quantity to be divided to said minuend input for two successive pulse train times and means for obtaining the result pulse train from said difference output during said second pulse train time.

12. A circuit arrangement for obtaining the integral portion of the number of times the value five is contained in a quantity represented by a serial train of pulses in the binary notation, comprising a subtracting means having a minuend input, a subtrahend input and a difference output, a delay means for delaying transmission for two pulse times connected between said difference output and said subtrahend input, means for applying the complement of the pulse train representing the quantity to be divided to said minuend input during a first pulse train time and for applying the pulse train representing the quantity to be divided to said minuend input during a second pulse train time and means for obtaining the result pulse train from said difference output during said second pulse train time.

13. A circuit arrangement for obtaining the integral portion of the number of times the value three or the value five is contained in a quantity represented by a serial train of pulses in the binary notation, comprising an adding-subtracting means having an augend-minuend input, an addend-subtrahend input and a sum-difference output, a delay means for delaying transmission for two pulse times connected between said sum-difference output and said addend-subtrahend input, means for applying the complement of the pulse train representing the quantity to be divided to said augend-minuend input during a first pulse train time and for applying the pulse train representing the quantity to be divided to said augend-minuend input during a second pulse train time, means for obtaining a result pulse train from said sum-difference output during said second pulse train time, means for complementing said result pulse train and means controlled in accordance with the selected divisor for controlling said adding-subtracting means to subtract and for rendering inactive said result complementing means or for controlling said adding-subtracting means to add and for rendering active said result complementing means.

14. A circuit arrangement for obtaining an integral portion of the number of times an integer value is contained in a quantity represented by a serial train of pulses in the binary notation, comprising an algebraic adding means having an augend-minuend input, an addend-subtrahend input, and a sum-difference output, a delay means for delaying transmission for an integral number of pulse times different from the number of pulse times assigned to said serial train connected between said sum-difference output and said addend-subtrahend input, means for controlling said algebraic adding means to govern the algebraic signs of the quantities added algebraically, input means for receiving the pulse train representing the quantity to be divided and for applying a pulse train related thereto to said augend-minuend input and output means for receiving the pulse train appearing at said sum-difference output and for presenting a related pulse train as a result pulse train.

15. The circuit arrangement according to claim 14, wherein said input means includes in parallel arrangement, a direct connection and a pulse train delay means and said output means includes a timed gating means.

16. The circuit arrangement according to claim 15, wherein said output means further includes a selectively effectuated complementing means.

17. The circuit arrangement according to claim 14, wherein said input means includes in parallel arrangement, a complementing means and a pulse train delay means and said output means includes a timed gating means.

18. The circuit arrangement according to claim 17, wherein said output means further includes a selectively effectuated complementing means.

19. Apparatus for deriving the whole number quotient of a dividend number, represented by a code group of binary digit pulses, and a divisor number which comprises, an algebraic binary adding apparatus having a first input terminal, a second input terminal and an output terminal, connections for applying said code group to said first input terminal, and delay means for connecting said output terminal with said second input terminal, said delay means being constructed for delaying signals by an integral multiple of the time intervals assigned to digit pulses of said code group, said integral multiple being fixedly related to said divisor number and said integral multiple of time intervals being less than the time interval assigned to said code group.

References Cited in the file of this patent

UNITED STATES PATENTS

| | | |
|---|---|---|
| 2,686,632 | Wilkinson | Aug. 17, 1954 |
| 2,701,095 | Stibitz | Feb. 1, 1955 |
| 2,758,787 | Felker | Aug. 14, 1956 |
| 2,789,760 | Rey et al. | Apr. 23, 1957 |
| 2,795,378 | Beranger | June 11, 1957 |

OTHER REFERENCES

Dunn et al.: "A Digital Computer for Use in an Operational Flight Trainer," IRE Transactions on Electronic Computers, June 1955. Pages 58–60 relied on.

UNITED STATES PATENT OFFICE

CERTIFICATE OF CORRECTION

Patent No. 3,039,691 June 19, 1962

Howard M. Fleming Jr., et al.

It is hereby certified that error appears in the above numbered patent requiring correction and that the said Letters Patent should read as corrected below.

Column 3, line 19, for "21" read -- 11 --.

Signed and sealed this 31st day of December 1963.

(SEAL)
Attest:
ERNEST W. SWIDER

Attesting Officer

EDWIN L. REYNOLDS

Acting Commissioner of Patents